(12) United States Patent
Sorkin

(10) Patent No.: US 9,423,059 B1
(45) Date of Patent: Aug. 23, 2016

(54) DUCT COUPLER FOR SEGMENTAL CONSTRUCTION

(76) Inventor: Felix L. Sorkin, Stafford, TX (US)

(*) Notice: Subject to any disclaimer, the term of this patent is extended or adjusted under 35 U.S.C. 154(b) by 1344 days.

(21) Appl. No.: 12/372,621

(22) Filed: Feb. 17, 2009

(51) Int. Cl.
*F16L 17/06* (2006.01)

(52) U.S. Cl.
CPC ..................... *F16L 17/06* (2013.01)

(58) Field of Classification Search
CPC ....... F16L 17/06; F16L 17/08; F16L 19/0212; F16L 19/041; F16L 19/06; F16L 19/0857; F16L 19/108
USPC ......... 285/223, 226, 227, 229, 230, 231, 237, 285/363; 52/220.1–220.8, 223.1–223.1, 52/250, 790.1
See application file for complete search history.

(56) References Cited

U.S. PATENT DOCUMENTS

| | | | | |
|---|---|---|---|---|
| 915,502 A * | 3/1909 | Struer | ........................... | 285/302 |
| 1,424,586 A * | 8/1922 | Page | ........................... | 285/229 |
| 1,621,950 A * | 3/1927 | Perkins | ........................... | 285/230 |
| 1,916,479 A * | 7/1933 | Howell et al. | ........................... | 285/229 |
| 1,959,826 A * | 5/1934 | Howell et al. | ........................... | 285/229 |
| 2,451,438 A * | 10/1948 | Hartman | ........................... | 285/236 |
| 3,359,014 A * | 12/1967 | Clements | ........................... | 285/55 |
| 3,666,296 A * | 5/1972 | Fischetti | ........................... | 285/45 |
| 3,690,701 A * | 9/1972 | Gramain | ........................... | 285/111 |
| 4,186,949 A * | 2/1980 | Bartha et al. | ........................... | 285/226 |
| 5,265,652 A * | 11/1993 | Brunella | ........................... | 141/59 |
| 6,886,388 B1 * | 5/2005 | McGill et al. | ........................... | 73/40.5 R |
| 7,010,824 B2 * | 3/2006 | Stubler et al. | ........................... | 14/22 |

* cited by examiner

*Primary Examiner* — James Hewitt
(74) *Attorney, Agent, or Firm* — Egbert Law Offices, PLLC

(57) ABSTRACT

A coupler apparatus for use with concrete segments has a first duct having an end and an exterior surface, a first coupler member having a connector, a second duct having an end and an exterior surface, a second coupler member having a connector, and a gasket received in the connectors of the first and second coupler members for forming a liquid-tight seal between the first and second ducts. The first duct and first coupler member are embedded in a first concrete segment. The second duct and second coupler member are embedded in a second concrete segment. The gasket has a generally annular shape. The gasket has a bulge portion positioned between a first end and a second end. Each concrete segment has an end surface. The bulge portion fits between the end surfaces of the concrete segments.

11 Claims, 10 Drawing Sheets

DUCT COUPLER FOR SEGMENTAL CONSTRUCTION

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the assembly and installation of precast concrete segments used in construction of concrete structures, such as bridge and highway construction. Particularly, the present invention relates to couplers for joining the ends of interior ducts of such precast concrete segments in end-to-end liquid-tight relationship.

2. Description of Related Art Including Information Disclosed Under 37 CFR 1.97 and 37 CFR 1.98.

Precast segmental bridges are known and commonly used throughout the world as a means to forge roadways through mountainous terrain or across rivers or other barriers. Such bridges are typically constructed in accordance with the following sequence: First, a series of upright piers are formed along the bridge span. Thereafter, cantilevered bridge sections are built out of each pier by successively mounting the precast segments to previously completed bridge components and post-tensioning the segments thereto. The cantilevered bridge sections are built out from each pier in a symmetrical fashion so that the piers are not subjected to undue bending loads. When the cantilevered sections are complete, the ends thereof are post-tensioned together to form a continuous bridge deck. Typically, two such bridge spans are constructed to accommodate the two directions of travel. These spans are generally side-by-side, but need not be parallel (horizontally or vertically) nor at the same elevation.

FIGS. 1-4 illustrate a form of such precast segmental bridge construction in accordance with the teachings of U.S. Pat. No. 5,231,931, issued on Aug. 3, 1993 to G. Sauvagiot. This form of segmental precast bridge construction is particularly disclosed as used with a rapid transit viaduct system.

Referring to FIG. 1, there is shown an end view of a rapid transit viaduct section 2 with rapid transit vehicles 32 and 34 thereon. The section 2 includes a concrete segment 3. The section 2 has a central load-bearing member, or body member 4, supported by a pair of upright pier members 6 and 8. Extending laterally from opposite lower side portions of the body member 4 are a pair of lateral platform structures 10 and 12. Each of the platform structures 10 and 12 has a pair of rails 14 mounted thereon for carrying a rapid transit vehicle 32 and 34. In addition, each of the platform structures 10 and 12 can have an upright sidewall section 16 as required for safety, noise pollution, and other considerations. One or more sets of rails 14 are carried by each of the lateral platform structures depending on the requirements of the transit systems.

The platform structures 10 and 12 each include respective upper platform decks and respective lower support struts 22 and 24. The lower support struts 22 and 24 are mounted as close to the bottom of the body member 4 as practicable. Deck members 18 and 20 are mounted to the body member 4 at an intermediate portion thereof above the support struts 22 and 24. The support struts 22 and 24 angle upwardly from their point of attachment with the body member 4 until they intersect the deck members 18 and 20. As such, the deck members 18 and 20 and support struts 22 and 24 form a box section providing resistance to torsional loading caused by track curvature and differential train loading. This box section may be considered a closed base. The body member 4 bisects the closed base and extends vertically upwardly therefrom to provide span-wise bending resistance. Preferably, the entire duct section 2 is cast as a single reinforced concrete cross-section.

The platform structures 10 and 12 each include lower pier mounts 26 and 28. These are mounted respectively to the bottom of the support structures 22 and 24. The pier mounts 26 and 28 are, in turn, supported, respectively, on the piers 6 and 8 using a plurality of neoprene pads 30, which provide a cushioned support for the structure.

The viaduct section 2 shown in FIG. 1 forms part of a viaduct system supporting rails 14 for carrying rapid transit vehicles 32 and 34. The viaduct section 2 may be formed as a precast modular segment 3. The viaduct section 2 is then combined with other viaduct sections to form a precast segmental structure. To facilitate such construction, the body member 4 may be formed with interlock member 36, while the lateral platform structures 10 and 12 may be each formed with interlock members 38.

Referring to FIG. 2, there is shown a plan view of a viaduct system formed from precast sections 2. The sections 2 are modular concrete segments that are combined to form a precast segmental structure extending between sequentially positioned piers (not shown). The sections 2 are placed in longitudinally-abutting relationship. To facilitate that construction, the sections are match cast so that the abutting end portions thereof fit one another in an intimate interlocking relationship. Each successive section is therefor cast against a previously cast adjacent section to assure interface continuity.

The connection between adjacent modular sections 2 is further secured by way of the interlock members 36 and 38. On one end of each section 2, the interlock members 36 and 38 are formed as external key members. On the opposite end of each section 2, the interlock members are formed as an internal slot or notch, corresponding to the key members of the adjacent viaduct system. Match-casting assures that corresponding key members and slots, as well as the remaining interface surfaces, properly fit one another.

As seen in FIG. 2, the sections 2 are bound together with one or more post-tensioning cables or tendons 40, 42 and 44. The number of cables used will depend on a number of factors such as cable thickness, span length, and loading requirements. The tensioning cables are each routed along a predetermined path which varies in vertical or lateral position along the span of the segmental structure.

Referring to FIG. 3, there is shown an end view of a concrete segment 3 used in segmental construction of a rapid transit system. Adjacent segments are held together by post-tensioning cables 42 and 44 that extend through the concrete segment 3. As can be seen in FIG. 3, post-tensioning cables 40 are positioned externally of the concrete segment 3, and post-tensioning cables 42 and 44 are positioned internally of the concrete segment 3. Cables 42 and 44 extend through tunnels 50 formed in the concrete segment 3. It is important to note that multiple post-tension cables 42 can extend through a single tunnel 50 formed within the concrete segment 3.

Referring to FIG. 4, there is shown a cross-section view of the tunnel 50 formed in concrete segment 3, taken along sight line 4-4 of FIG. 3. Post-tensioning cables 52 are routed through the tunnel 50. To facilitate this routing, a continuous flexible duct 54 is initially inserted through the tunnel 50, and the post-tensioning cables 52 are thereafter placed in the duct 54. The duct 54 may advantageously be formed from polyethylene but could also be formed from other flexible materials. The post-tensioning cables 52 are tensioned using a conventional post-tensioning apparatus and the interior of the duct 54 is cement-grouted along the entire length thereof for corrosion protection of the cables 52.

One form of duct that is commercially available is shown in FIG. 5. The corrugated polymeric duct 56 is of a type presently manufactured by General Technologies, Inc. of Stafford, Tex., licensee of the present inventor. As can be see in FIG. 5, duct 56 has a plurality of corrugations 58 extending radially outwardly from the generally tubular body 60. The duct 56 has ends 62 and 64 through which post-tensioning cables can emerge. In FIG. 5, it can be seen that there are longitudinal channels 66, 68 and 70 extending along the outer surface of the tubular body 60. The longitudinal channels 66, 68 and 70 allow any grout that is introduced into the interior of the duct 56 to flow easily and fully through the interior of the duct 56. The longitudinal channels 66, 68 and 70 also add structural integrity to the length of the duct 56. It is important to realize that the duct 56 can be formed of a suitable length so as to extend fully through one of the sections 2 as used in a precast segmental structure.

Unfortunately, when such ducts, such as duct 56, are used in such precast segmental construction, it is difficult to seal the ends 62 and 64 of each duct to the corresponding duct of an adjacent section of the segmental structure. Conventionally, the segments are joined together in end-to-end relationship through the application of an epoxy material to the matching surfaces of the structure. Under such circumstances, it is very common for the epoxy to flow or to become extruded into the opening at the ends 62 and 64 of the duct when the segments are connected in end-to-end relationship. In other circumstances, a grout is pumped through the interior passageway of the duct 56 so as to offer a seal against the intrusion of air and water into the interior of the duct 56. Grout is pumped through the interior of the ducts. Unfortunately, if there is an incomplete connection between the duct 56 of one segment and the duct of an adjoining segment of the segmental structure, then the epoxy will leak out into the interface area between the segments and will not flow fully through the entire duct assembly. Once again, an incomplete grouting of the interior of the duct 56 may occur and make the cables 52 prone to corrosion.

It is important to note that in such precast concrete segmental construction, the concrete will slightly warp when matched with the adjoining section. Even though match casting is employed, the lack of homogeneity in the concrete mixtures used for the adjoining sections can cause a misalignment between matching sections. A great deal of tolerance must be maintained when a coupler is developed so that any warping or distortion in the surfaces of the matching segments can be accommodated.

The ability to avoid air and liquid intrusion into the interior of the duct 56 is very important in such multi-strand, precast concrete segmental structures. As can be seen in FIG. 1, because the structure is often used on bridges or elevated structures, the post-tensioning cables can be subject to a great deal of exposure from the elements. For example, if the bridge structure is associated with roads traveled by motor vehicles, then there is often the application of salt onto the highway. This salt, when dissolved in water, can leach through the area between the structure segments into the ducts and deteriorate the post-tensioning cables over time. As the post-tensioning cables become corroded, over time, they can weaken so as to potentially cause the failure of the segmental structure. Past experience with such structures has shown that the primary area of leakage is through cracks formed between adjoining concrete segments. As such, it is particularly important to provide a coupler for use in association with the plastic ducts which will effectively prevent any liquid intrusion from entering the area interior of the ducts and adjacent to the post-tensioning cables.

The present invention is the owner of several patents relating to duct couplers for use with precast concrete segmental construction. In particular, U.S. Pat. No. 6,764,105, issued on Jul. 20, 2004, discloses a coupler member for use with precast concrete segmental structures. The structure is illustrated in FIGS. 6 and 7 herein.

Referring to FIG. 6, there is shown the precast concrete segmental structure 100. The structure 100 includes a first concrete segment 102 and a second concrete segment 104. The first concrete segment 102 has an outer surface 106 which is joined in surface-to surface contact with the inner surface 108 of the concrete segment 104. The segments 102 and 104 are formed by match casting, as described hereinbefore.

Importantly, a first duct 110 is embedded in the first concrete structure 102. Duct 110 has a construction similar to that shown in FIG. 5, or similar to other multi-cable ducts. The first duct 110 has an end 112 generally adjacent to the exterior surface 106 of the concrete segment 102. Similarly, a second duct 114 is embedded in the second concrete segment 104. The second duct 114 has a configuration similar to that of duct 110. Duct 114 has an end 116 generally adjacent to the inner surface 108 of concrete segment 104. Each of the ducts 110 and 114 are embedded in the respective concrete segments 102 and 104 so as to be generally longitudinally aligned. The duct 110 has an interior passageway which will be axially aligned with the interior passageway of duct 114.

As can be seen in FIG. 6, a plurality of tendons 118 extend longitudinally through the interior passageways of the ducts 110 and 114. In FIG. 6, these tendons 118 are properly post-tensioned in a conventional manner. A grouting material 120 is introduced through the interior passageways 110 and 114 to further cement and seal the interior of the ducts 110 and 114 around the tendons 118. The grouting material, in combination with the polymeric material of the ducts 110 and 114, serves to avoid the adverse effects of liquid intrusion into the tendons 118.

A unique coupler apparatus 122 further assures the avoidance of liquid intrusion through the space between the exterior surface 106 of concrete segment 102 and the inner surface 108 of concrete segment 104. A first coupler member 124 extends over and around the exterior surface of the first duct 110. The first coupler member 124 has an end 126 opening at the exterior surface 106 of concrete segment 102. Similarly, the end 126 of the coupler member 124 is generally forward of, but adjacent to, the end 112 of first duct 110. A second coupler member 128 extends over and around the exterior surface of the second duct 114. The second coupler member 128 has an end 130 opening at the inner surface 108 of concrete segment 104. End 130 is slightly forward of the end 116 of the duct 114. A gasket 132 is received in the ends 126 and 130 of the respective coupler members 124 and 128. The gasket 132 is particularly designed to prevent liquid from passing between the ends 126 and 130 of the respective coupler members 124 and 128 into the interior of the ducts 110 and 114. The coupler members 124 and 128 have an identical configuration to each other. This serves to minimize the manufacturing requirements since only a single mold is required for each of the coupler members. Also, installation is easy since unskilled workers can install the first and second coupler members without regard to the configuration of a particular coupler member.

An external seal 134 is affixed in generally liquid-tight relationship to an opposite end 136 of the first coupler member 124 and is also affixed to an exterior surface of the first duct 110. In particular, the external seal 134 is formed of an elastomeric sleeve or an annular heat shrink material. The external seal 134 will be in compressive liquid-tight contact with the exterior surface of the first coupler member 124 and with the exterior surface of the duct 110. Prior to embedding the coupler member 124 into the concrete associated with the concrete segment 102, the coupler member 124 can be affixed in liquid-tight relationship by applying heat to the exterior surface of the external seal 134. As a result, the heat-shrink material of the external seal 134 will tightly engage the surfaces of the coupler member 124 and also the exterior surfaces of the duct 110. As a result, the external seal 134 will prevent liquid intrusion through the opposite end 136 of the coupler member 124.

An internal seal 138 is interposed in generally liquid-tight relationship between the interior surface of the second coupler member 128 and the exterior surface of the second duct 114. This internal seal 138 is a generally annular ring formed of an elastomeric material. The internal seal 138 is positioned to allow relative movement between the second coupler member 128 and the second duct 114 while maintaining the liquid-tight relationship between the coupler member 128 and the duct 114. The ability to allow relative movement between the coupler member 128 and the duct 114 is important because of the "match casting" used for the formation of the second concrete segment 104. If there is any warping or inconsistent relationship between the surfaces 106 and 108, the second coupler member 128 will be able to relatively move with respect to the exterior surfaces of the duct 114 to adjust for such warping or inconsistencies. The second coupler member 128 is also movable in relation to any expansion or contraction of the concrete segments 102 and 104. This can be done without affecting the liquid-tight environment between the coupler member 128 and the duct 114.

In FIG. 6, it can be seen that the end 126 of the first coupler member 124 has a generally V-shaped groove facing the second coupler member 128. In particular, it is the opening of this V-shaped groove which faces the second coupler member 128. Similarly, the end 130 of the second coupler member 128 is a V-shaped groove which faces the V-shaped groove of the end 126. It can be seen that the gasket 132 is fitted into the V-shaped groove at one of the ends 126 and 130 or into both of the ends 126 and 130.

So as to further assure the avoidance of any liquid intrusion, it can be seen that the end 126 of the first coupler member 124 has a surface 140 which is in abutment with the end 112 of the first duct 110. Similarly, the, second coupler member 128 has a surface 142 which is in abutment with the end 116 of the second duct 114. This relationship further assures the accurate placement of the coupler members in end-to-end relationship and further assures the alignment of the ducts 110 and 114.

As can be seen in FIG. 6, the gasket 132 is an elastomeric ring having a cross-sectional thickness greater than a depth of either of the V-shaped grooves of the respective ends 126 and 130 of the coupler members 124 and 128. As a result, the elastomeric ring of the gasket 132 will effectively "fill" the outer portions of the V-shaped grooves. The configuration of the V-shaped grooves causes the elastomeric material of the gasket 132 to "extrude" thereinto so as to establish a tight sealing relationship therewith.

The first duct 110, the second duct 114, the first coupler member 124 and the second coupler member 128 are formed of a polymeric material. Each of these components can be formed in an injection molding process. Similarly, the gasket 132 can be formed of an elastomeric or other resilient material. The material used for the gasket 132 should be suitably hydrophobic so as to resist any liquid intrusion.

Referring to FIG. 7, there is shown a cross-sectional view of the duct 100 prior to the installation of the tendons 118 and the installation of the grout 120. The first duct 110 is suitably mounted against a metal bulkhead having a flat surface corresponding to the formation of the exterior surface 106 of concrete segment 102. A suitable fixture is provided on the metal bulkhead which will extend into the interior 160 of the first duct 110. Prior to the installation of the first duct 110 onto the bulkhead fixture, the coupler member 124 is placed over the exterior surface of the first duct 110. Similarly, the external seal 134 is placed over the end 162 of the coupler member 124 opposite the end 126. A suitable heating device, such as a hot air blower, can be applied to the external seal 134 so as to heat shrink the seal 134 upon the exterior surface of the duct 110 and upon the exterior surface of the first coupler member 124. Once the duct 110, along with the attached coupler member 124, is placed upon the bulkhead fixture, the concrete 164 can then be poured into a suitable mold. After solidifying, the metal bulkhead and the attached bulkhead fixture are removed from the surface 106 so as to create a flat surface thereagainst. Upon solidification, the inner surface 108 of the concrete segment 104 will be formed by match casting. In other words, the surface 106 will act as a surface for the formation of surface 108. A suitable mandrel or alignment plug can be placed into the interior passageway 160 of the first duct 110. This alignment plug can extend outwardly beyond the surface 106. The second coupler member 128 can then be applied onto the exterior surface of the second duct 114. The internal seal 138 is interposed between the inner surface of the second coupler member 128 and the exterior surface of the duct 114. The second duct 114 and its associated coupler 128 can then be placed over the alignment plug extending outwardly of the interior passageway 160 of the duct 110 so as to extend into the interior passageway 166 of the second duct 114. Because there is a possibility of slight misalignment during the formation of the second concrete segment 104, the second coupler member 128 is slidable relative to the duct 114 by virtue of the "rollability" of the internal seal 138.

After the concrete solidifies, the surface 108 will be separated from surface 106. Similarly, the end 130 of the coupler member 128 will be separated from the end 126 of the coupler 124. The gasket 132 can then be installed into the V-shaped groove associated with the end 130 of the second coupler 128. Because of the enlarged cross-sectional area of the annular gasket 132, a portion of the gasket 132 will extend outwardly beyond the end 130 of the second coupler member 128.

The segment 102 can then be installed as part of the segmental structure. The segment 104 is then transported into position so that the surface 108 will face the surface 106. Because it is possible that a misalignment of the surface of the segments can occur, the particular arrangement of the V-shaped grooves and the shape of the gasket 132 will accommodate any misalignment. When the surface 108 is brought into proximity against the surface 106, the relatively pointed side 168 of the gasket 132 will "funnel" into the V-shaped groove 170 at the end 126 of the first coupler member 124. Particularly, the pointed side 168 may contact either of the sides 172 or 174 of the V-shaped groove 170. As the surface 108 is brought further into proximity with surface 106, the gasket 132 will extrude into the V-shaped groove 170 so as to establish an effective liquid-tight seal therewith. After assembling and epoxying of the surfaces 106 and 108 together, tendons can be extended through the interior passageways 160 and 166 of the respective ducts 110 and 114 so as to permanently join the segments 102 and 104 in post-tensioned relationship.

Importantly, as can be seen in FIG. 6, the use of the unique configuration of the gasket 132, along with V-shaped groove 170, will avoid any intrusion of epoxy into the interior passageways 160 and 166. The gasket 132 will block the extruded epoxy from flowing in an undesired manner into the interior passageways 160 and 166. In a similar manner, the gasket 132 will also prevent any liquid intrusion from passing into these interior passageways. The compressive relationship between the V-shaped grooves associated with the coupler members 124 and 128 establishes a strong sealing bond between the coupler members which will be resistive to the elements over an extended period of time. Subsequent to installation, the grout can be effectively pumped through the interior passageways 160 and 166 without any grout accidentally flowing outwardly of the ducts 110 and 114 in the area of the space between the segments 102 and 104. Secondary liquid intrusion is effectively accomplished through the tight sealing relationship of the external seal 134 and the sliding sealing of the internal seal 138.

U.S. Pat. Nos. 6,764,105, 6,834,890 and 6,874,821 show variations on this prior invention. In particular, U.S. Pat. No. 6,764,105, issued on Jul. 20, 2004 to the present inventor, discloses a coupler member for use with precast concrete segmental structures. This coupler member has a first duct, a first coupler member extending over and around an exterior surface of the first duct and having a seat opening adjacent an end of the first duct, a second duct, and a second coupler member extending over and around an exterior surface of the second duct and having a seat opening adjacent to an end of the second duct. A gasket is received in the seats of the first and second coupler members. An external seal is affixed to an opposite end of the first coupler member and affixed to an exterior surface of the first duct. The seats of the first and second coupler members have slots facing one another. The gasket is received within these slots. The gasket has a tapered outer surface suitable for liquid-tight abutment against an inner surface of one of the slots.

U.S. Pat. No. 6,834,890, issued on Dec. 28, 2004 to the present inventor, describes another coupler apparatus for use with tendon-receiving ducts in a segmental precast concrete structure. This coupler apparatus includes a coupler body having an interior passageway for receiving the duct therein. The coupler body has a generally U-shaped channel formed at one end thereof. The coupler element has a connector element formed on interior thereof adjacent one end of the coupler body so as to allow the coupler element to receive a variety of implements for the formation of the precast concrete segment.

One of the problems associated with these prior art patents is that each of these prior art patents is particularly designed where the tendons are maintained in generally longitudinal alignment. However, in precast concrete construction, the edges of the concrete segments will be aligned with each other while the ducts extend at an angle with respect to these edges. As such, it is necessary for the coupler apparatus to be able to accommodate the angled relationship of the ducts. Because each of the coupler segments must open at an end of the concrete structure and be joined together at such end, the coupler apparatus must be able to accommodate the fact that the ducts extend at an angle with respect to these ends. As such, U.S. Pat. No. 6,874,821, issued on Apr. 5, 2005 to the present inventor, was designed to accommodate this angled relationship of the ducts. This patent describes a coupler apparatus for use with precast concrete segmental construction. The coupler apparatus has a first duct, a first coupler member extending over and around the first duct, a second duct, a second coupler member extending over and around the second duct, and a gasket received at the ends of the first and second coupler members so as to prevent liquid from passing between the coupler members into an interior of either of the ducts. The ducts extend at a non-transverse acute angle with respect to the ends of the coupler members. Heat shrink seals are affixed to the opposite ends of the coupler members so as to secure the coupler members to the ducts in liquid-tight relationship. The ends of the coupler members have generally V-shaped grooves facing each other. The gasket is received in compressive relationship within the V-shaped grooves.

Although the device shown in U.S. Pat. No. 6,874,821 is effective for connecting angled post-tension cables in precast concrete segmental construction, it is believed important to be able to flexibly arrange the positioning of the ducts with respect to the coupler members. As such, a need developed so as to provide a structure whereby the angled relationship of the ducts can be easily and effectively achieved through the use of standard coupler constructions.

U.S. patent application Ser. No. 11/861,166, filed on Sep. 25, 2007 by the present inventor discloses a coupler apparatus for use with concrete segments has a first duct, a first coupler member having a connector and a flexible boot extending therefrom and having an end extending over a surface of said first duct, a second duct, a second coupler member having a connector and a flexible boot extending therefrom and extending over an exterior surface of the second duct, and a gasket received in the connectors of the first and second coupler members for forming a liquid-tight seal between the first and second ducts. Clamps are affixed over the ends of the flexible boot so as to establish a liquid-tight seal with the respective ducts. The connector includes an annular section affixed to an end of the flexible boot and an annular groove formed around this annular section.

Through the use of the above-identified couplers with concrete segments, it was discovered that the ends of concrete segments do not always have a flat, uniform face. That is, the ends can have non-uniform contours that create large gaps between the faces of two concrete segments in some area and smaller gaps between the two faces of two concrete segments in other areas. The gaskets and couplers of the prior art couplers mentioned above cannot accommodate for these inconsistencies in the faces of the concrete segments. Thus, the gaskets can be too small for the gap between two faces so as to allow liquid to enter the interior of the ducts that are kept within the concrete segments. Liquid and other contaminants can enter the interior of the ducts. The presence of liquid and other contaminants in the ducts can cause tendons within the ducts to corrode and weaken. Weakened tendons can result in a shorter life span of the concrete structure and even failure of the structure. Thus, there is a need for a coupler that has a gasket that can accommodate for non-uniform gaps between adjacent concrete segments.

It is an object of the present invention to provide a coupler apparatus that accommodates for non-uniform gaps between adjacent concrete segments that are used in precast segmental structures.

It is another object of the present invention to provide a coupler apparatus which allows for the coupling of multi-tendon ducts in precast segmental concrete structures.

It is another object of the present invention to provide a coupler apparatus which automatically adjusts for any misalignments or warpage in the matching concrete segments.

It is another object of the present invention to provide a coupler apparatus which assures a seal between the coupler and the connected duct.

It is still another object of the present invention to provide a coupler apparatus which is easy to install, easy to use, and easy to manufacture.

It is another object of the present invention to provide a coupler apparatus which effectively prevents the intrusion of an epoxy into the interior of the duct during the sealing of one structural segment to another structural segment.

It is another object of the present invention to provide a symmetrical duct coupler which facilitates the ability to manufacture and install the components thereof.

It is still another object of the present invention to provide a coupler apparatus which is universally adaptable between ducts that extend transverse to the edges of the segmental construction to those ducts that extend at an angle with respect to edge of the concrete structure.

It is another object of the present invention to provide a coupler apparatus that flexibly allows the ducts to move longitudinally toward or away from each other within the concrete structure.

These and other objects and advantages of the present invention will become apparent from a reading of the attached specification and appended claims.

BRIEF SUMMARY OF THE INVENTION

The present invention is a coupler apparatus for use with concrete segments comprising a first duct having an end and an exterior surface, a first coupler member having a connector and a flexible boot extending from the connector, a second duct having an end and an exterior surface, a second coupler member having a connector and a flexible boot extending from the connector, and a gasket received in the connectors of the first and second coupler members for forming a liquid-tight seal between the first and second ducts. The gasket has a generally annular shape. The gasket has bulge portion. The flexible boot has an end opposite the connector extending over and around the exterior surface of the first duct at the end thereof. The flexible boot of the second coupler member has an end opposite the connector of the second coupler member extending over and around the exterior surface of the second duct at the end thereof. The first duct and first coupler member are embedded in a first concrete segment. The second duct and second coupler member are embedded in a second concrete segment. The first concrete segment has an end surface. The second concrete segment has an end surface.

The gasket has a first end portion and a second end portion. The bulge portion is positioned between the first and second end portions. The bulge portion extends radially outwardly farther than the first and second end portions of the gasket. The bulge portion has a thickness greater than a thickness of the first and second end portions of the gasket. The gasket fits between the end surfaces of the concrete segments.

The apparatus further comprises a first clamping means affixed over the flexible boot of the first coupler member, and a second clamping means affixed over the flexible boot of the second coupler member. The first clamping means seals the end of the flexible boot in liquid-tight relation over the first duct. The second clamping means seals the end of the flexible boot of the second coupler member in liquid-tight relationship over the second duct. The first clamping means is an annular member affixed in compressive contact over the flexible boot of the first coupler member. The second clamping means is an annular member affixed in compressive contact over the flexible boot of the second coupler member.

The connector of the first coupler member is a generally rigid structure. The connector of the second coupler member is a generally rigid structure. The connector of the first coupler member has an annular surface formed on an end thereof. The connector of the second coupler member has a annular surface formed on an end thereof. The first end portion of the gasket is received in the annular surface of the first coupler member. The second end portion of the gasket is received in the annular surface of the second coupler member. Each of the annular surfaces of the first and second coupler members is a groove with a generally U-shaped cross-section.

The connector of the first coupler member has an annular section affixed to an opposite end of the flexible boot of the first coupler member. The connector of the second coupler member has an annular section affixed to an opposite end of the flexible boot of the second coupler member. The annular surface of the connector of the first coupler member is formed around an end of the annular section of the first coupler member opposite the flexible boot of the first coupler member. The annular surface of the connector of the second coupler member is formed around an end of the annular section of the second coupler member opposite the flexible boot of the second coupler member. The annular section of the connector of the first coupler member has an outer surface affixed within an interior of the opposite end of the flexible boot of the first coupler member. The annular section of the connector of the second coupler member has an outer surface affixed within an interior of the opposite end of the flexible boot of the second coupler member. The annular surface of the first coupler member is formed radially outwardly of the annular section of the first coupler member and longitudinally outwardly of the flexible boot of the first coupler member. The annular surface of the second coupler member is formed radially outwardly of the annular section of the second coupler member and longitudinally outwardly of the flexible boot of the second coupler member.

DETAILED DESCRIPTION OF THE INVENTION

Figure 1:
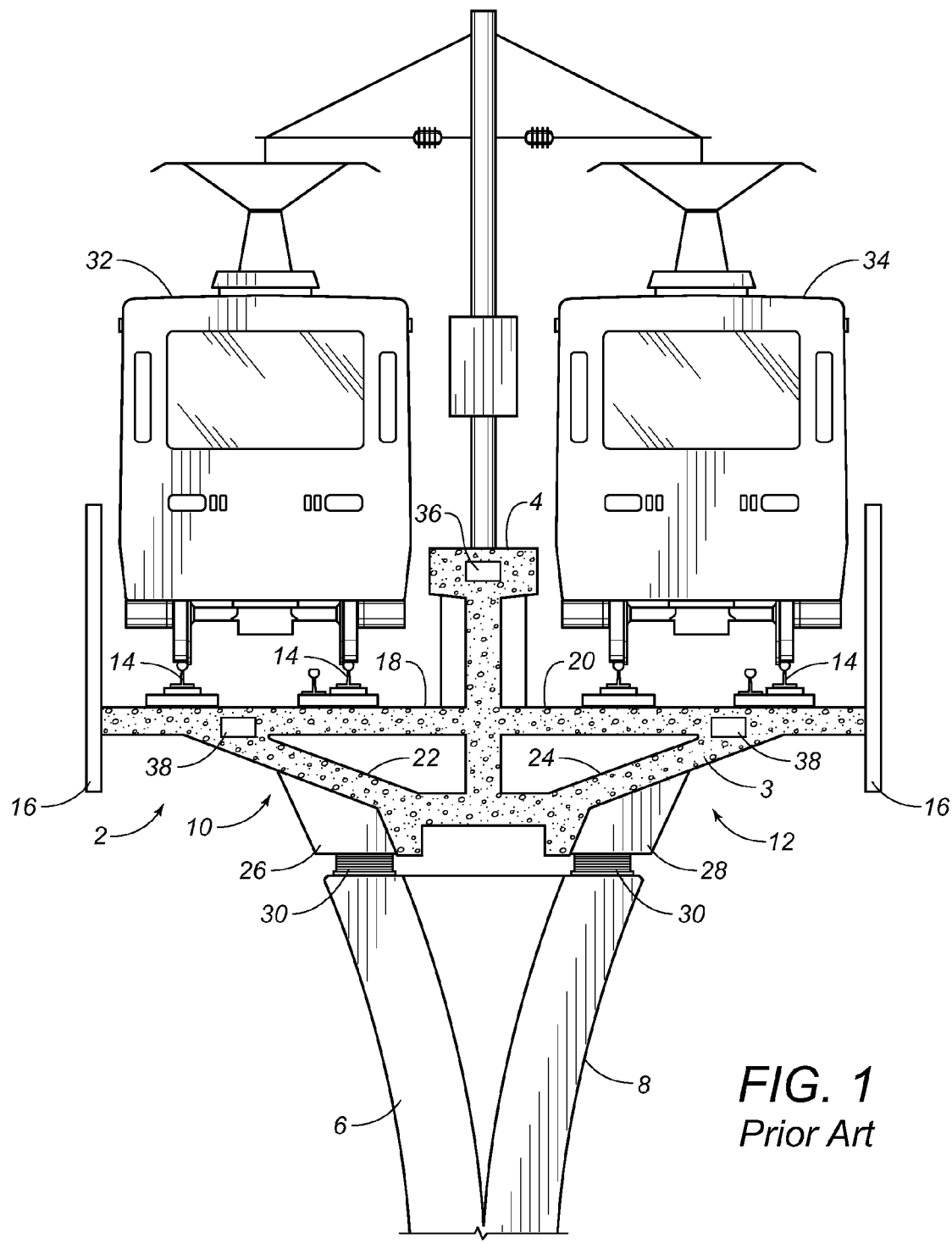
FIG. 1 shows an end elevational view of a prior art concrete section of a rapid transit viaduct system, with the concrete section being a concrete segment of a segmental concrete structure.
Figure 2:
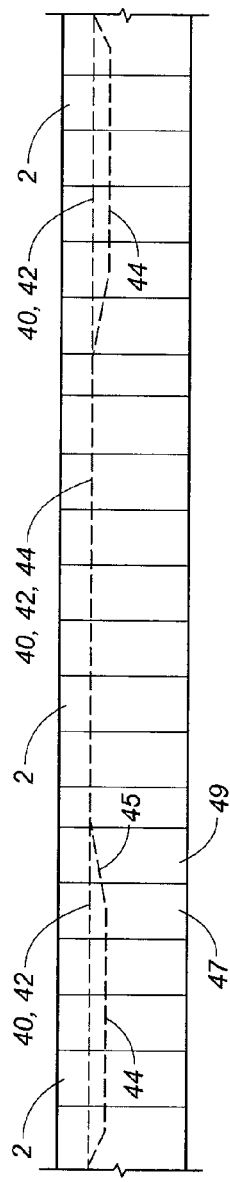
FIG. 2 shows a plan view of a viaduct system formed from precast sections.
Figure 3:
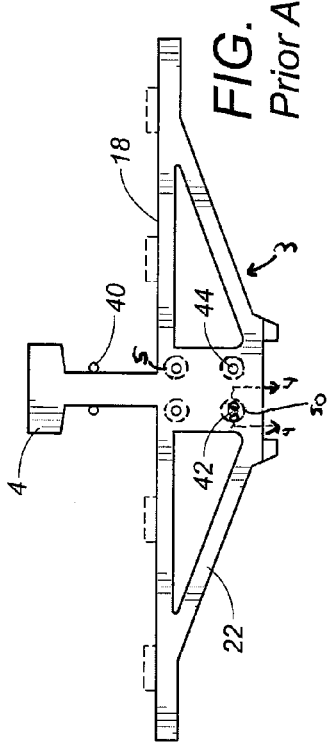
FIG. 3 is an end view of a precast concrete segment used in segmental construction of a rapid transit system.
Figure 4:
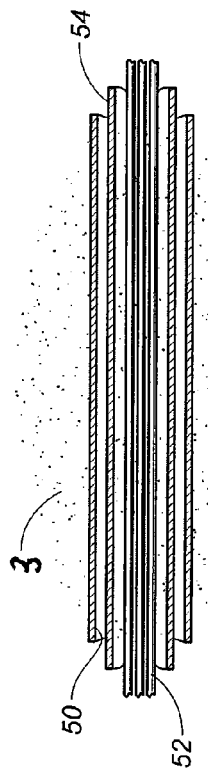
FIG. 4 shows a cross-sectional view of a tunnel formed in the concrete segment, taken along sight line 4-4 of FIG. 3.
Figure 5:
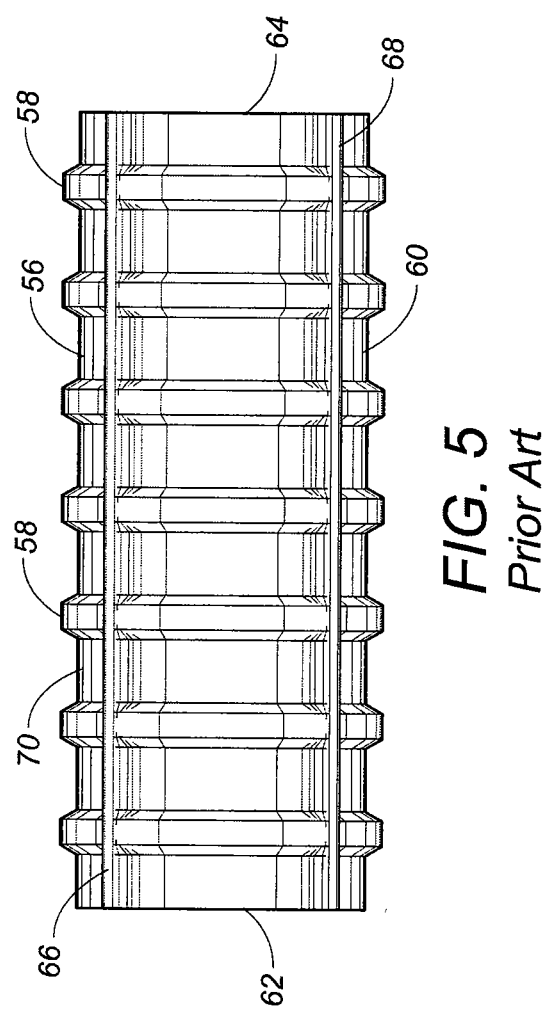
FIG. 5 shows a plan view of a prior art multi-cable duct.
Figure 6:
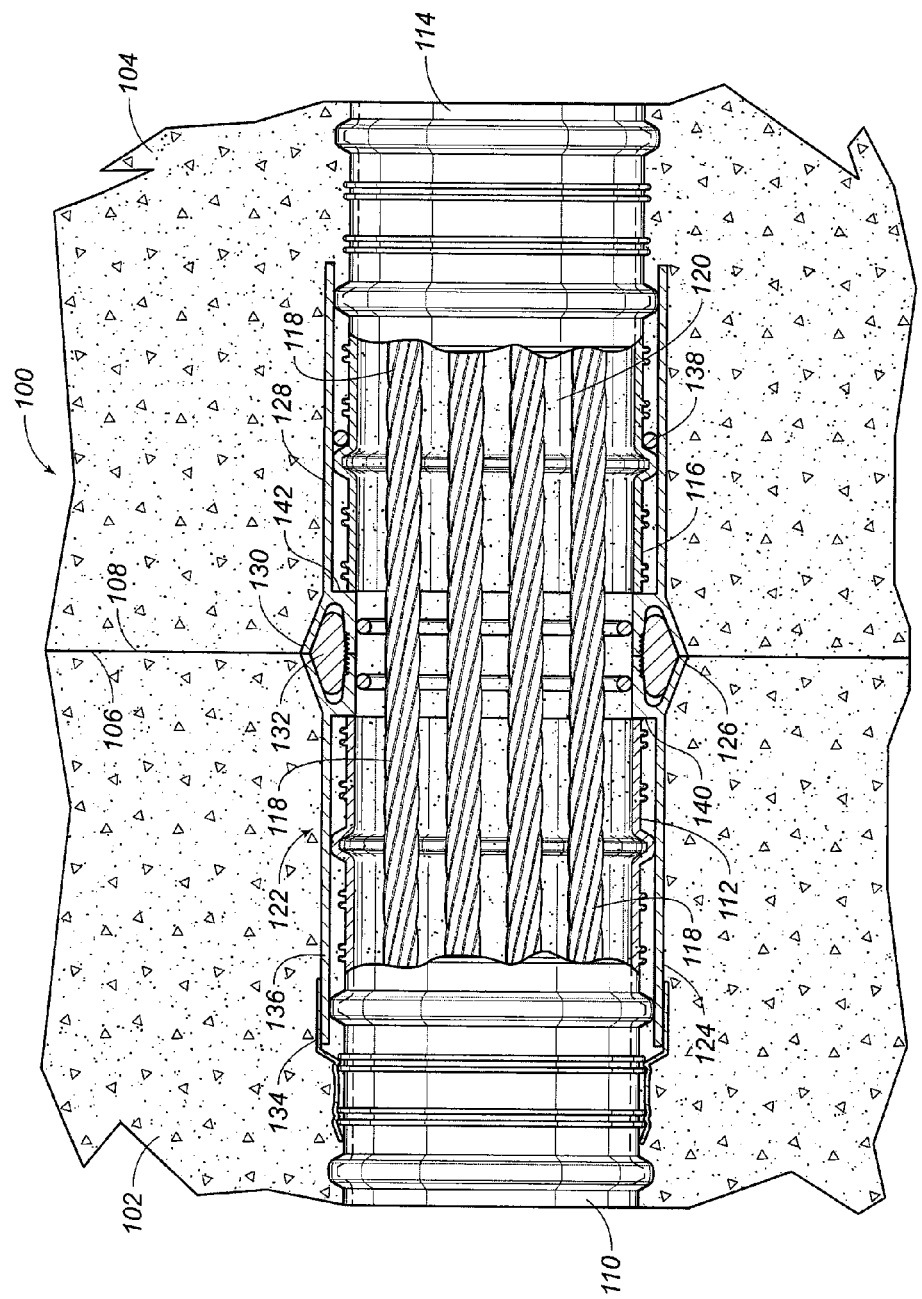
FIG. 6 is a partial cross-sectional view of a prior art duct, showing a coupler assembly as used in a precast concrete segmental structure of the prior art, after cables are inserted and grout is filled within the interior of the duct.
Figure 7:
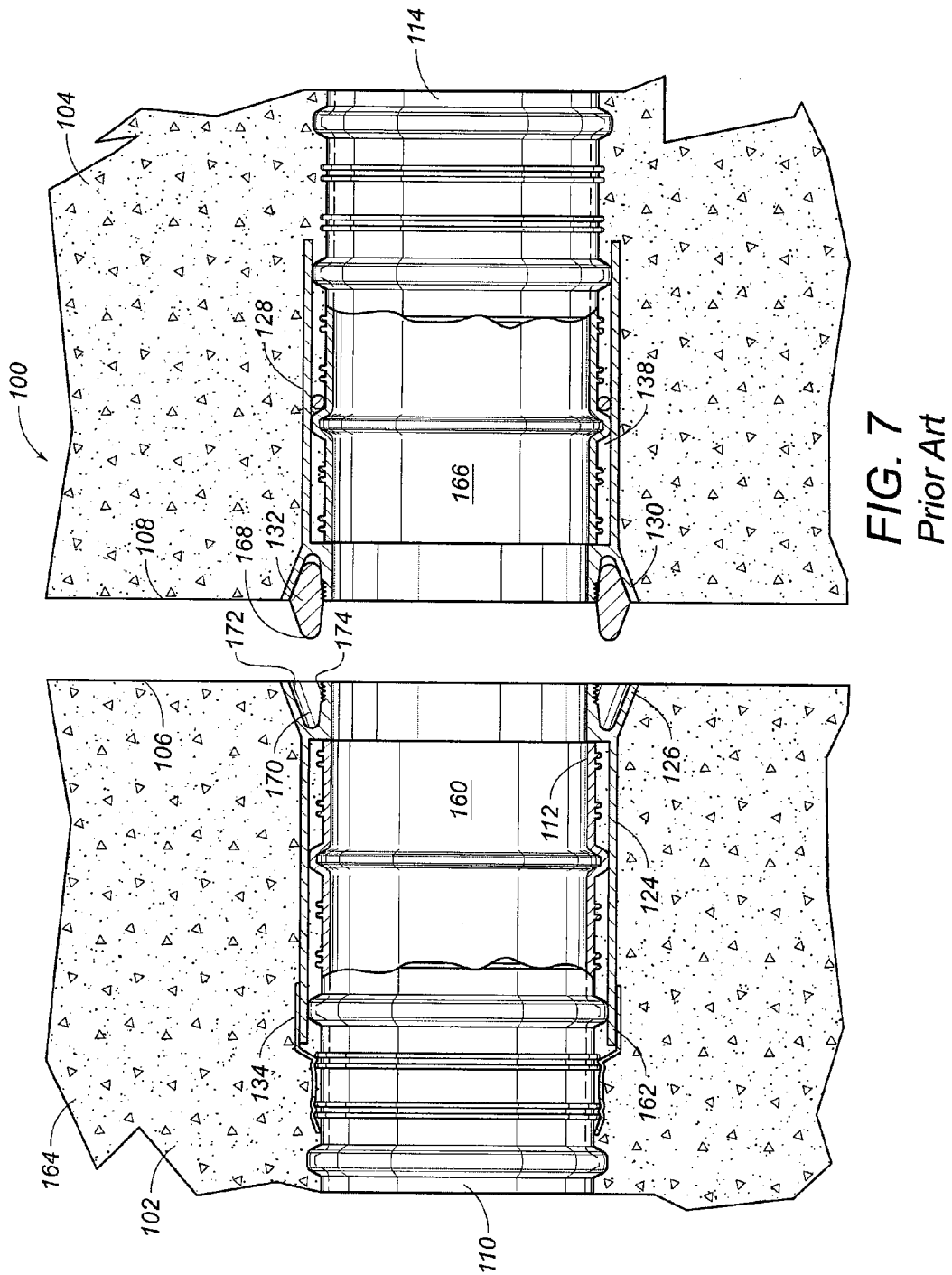
FIG. 7 is a partial cross-sectional view showing the assembly of the coupler apparatus of the prior art of FIG. 6, before cables are inserted and grout is filled within the interior of the duct.
Figure 8:
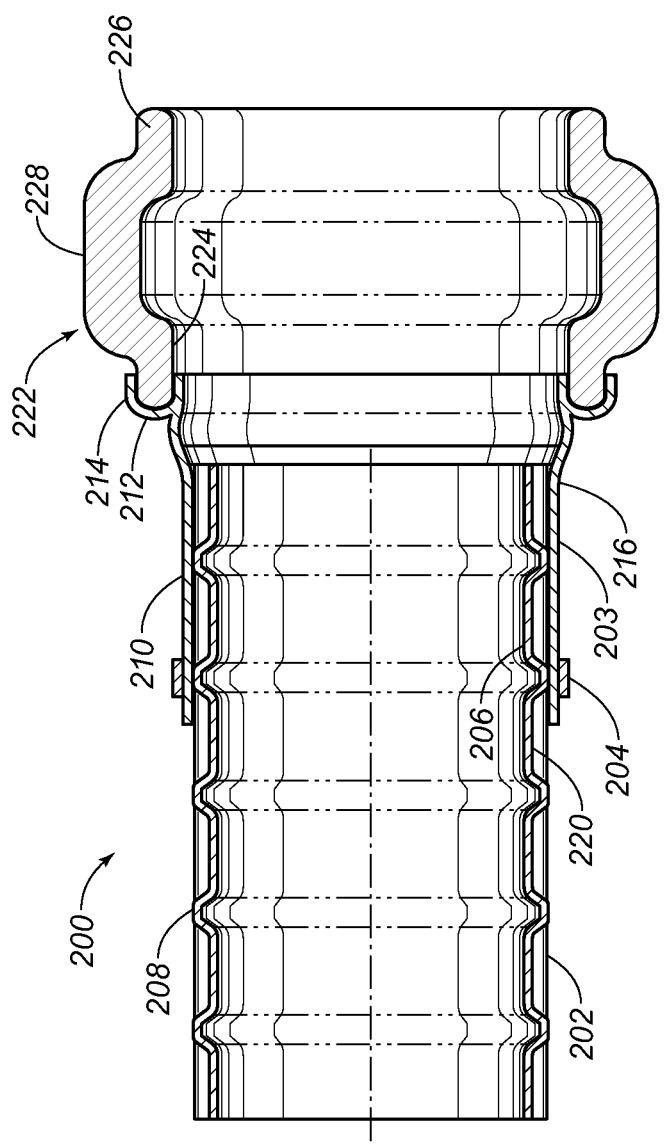
FIG. 8 shows a cross-sectional view of the preferred embodiment of the coupler apparatus of the present invention without a flexible boot.

Referring to FIG. 8, there is shown the coupler apparatus 200 in accordance with the teachings of the present invention. The coupler apparatus 200 includes a duct 202 having a connector 203 connected over an end 206 thereof. A clamp 204 is placed around the outer diameter of the connector 203 and over the outer diameter of the duct 202 so as to secure the end of the connector 203 in liquid-tight sealing relationship against the ridges 208 of the duct 202. The connector 203 has an annular section 210 connected to an end of the connector 203 opposite the duct 202. The annular section 210 includes an annular groove 212 formed outwardly thereof. The annular groove 212 defines an interior passageway 214 therein.

The clamp 204 is also an annular surface that has an inner surface juxtaposed against the exterior surface of the end 218 of the connector 203. In normal use, this "clamp means" can include various structures that serve to establish a strong compressive contact between the inner surface of the connector 203 and the exterior surface of the ridges 208 of duct 202. For example, a lever-type mechanism can be incorporated into the structure of the clamp 204 so as to create this compressive contact. In other circumstances, the clamp 204 can be in the nature of a band of heat-shrink material. When heat is applied to the heat-shrink material, it establishes a strong bonding relationship over of the exterior surface of the end 218 of the connector 203 while, at the same time, creates the requisite compressive contact between the inner surface of the end 218 of boot 203 and the exterior surfaces of the ridges 208 of the duct 202. Other types of mechanisms, such as retracting clamps, threaded braces, and other devices can be utilized in association with the boot 203 so as to establish the "clamping means".

Figure 9:
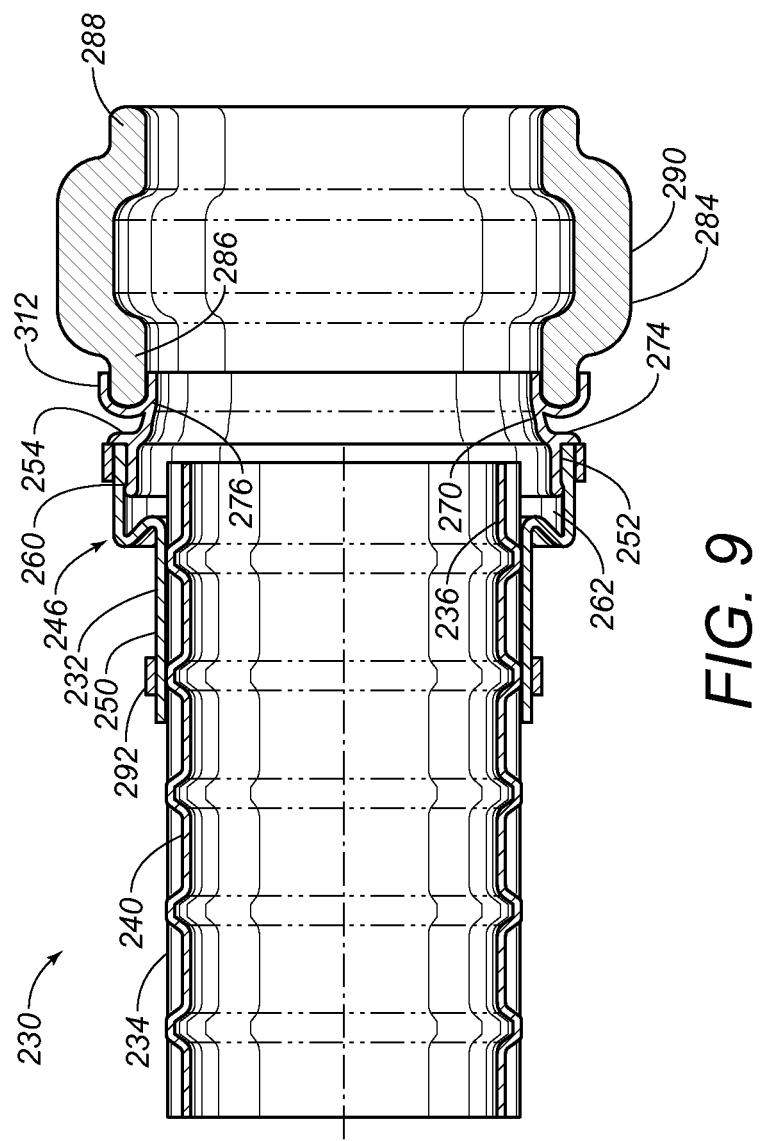
FIG. 9 shows a cross-sectional view of the preferred embodiment of the coupler apparatus of the present invention with a flexible boot.
Figure 10:
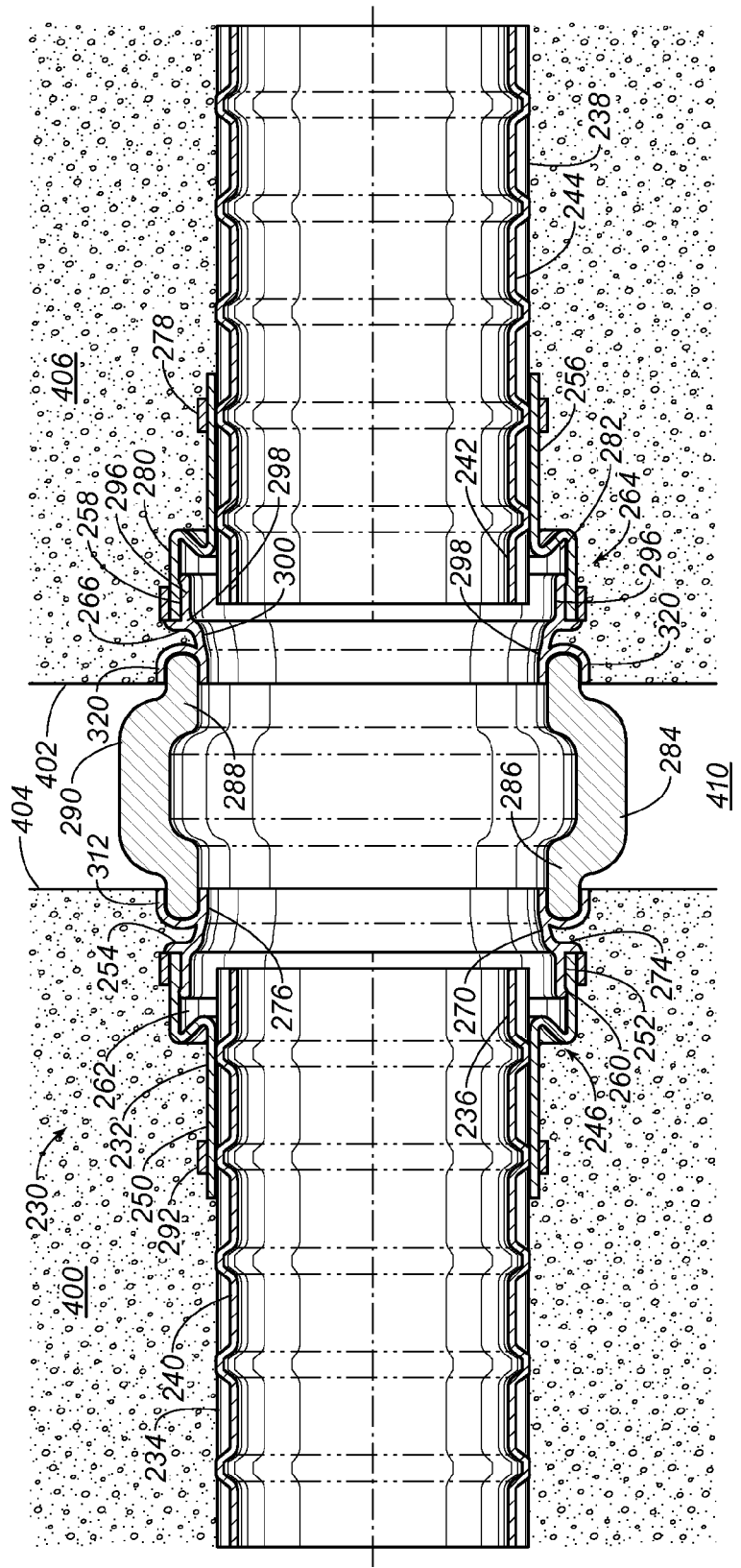
FIG. 10 shows a cross-sectional view of preferred embodiment of coupler apparatus of the present invention, with the ducts cast in concrete segments and the gasket positioned therebetween.

Referring to FIGS. 9 and 10, there are shown a cross-sectional views of the preferred embodiment of the coupler apparatus 230 of the present invention with a flexible boot 232. The coupler apparatus 230 has a first duct 234, a first coupler member 246 that has a connector 254 and a flexible boot 232 extending from the connector 254, a second duct 238, a second coupler member 264 that has a connector 266 and a flexible boot 256 extending from the connector 266, and a gasket 284 received in the connectors 254 and 266 of the first and second coupler members 246 and 264, respectively. The first duct 234 has an end 236 and an exterior surface 240.

The second duct 238 has an end 242 and an exterior surface 244. The flexible boot 232 of the first coupler member 246 has an end 250 opposite the connector 254 that extends over and around the exterior surface 240 of the first duct 234 at the end 236 thereof. The flexible boot 256 of the second coupler member 264 has an end 278 opposite the connector 266 that extends over and around the exterior surface 244 of the second duct 238 at the end 242 thereof.

The gasket 284 forms a liquid-tight seal between first and second ducts 234 and 238. The gasket 284 has a generally annular shape. The gasket 284 has a first end portion 286, a bulge portion 290, and a second end portion 288. The bulge portion 290 is positioned between the first end portion 286 and the second end portion 288. The bulge portion 290 extends radially outwardly farther than the first and second end portions 286 and 288. The bulge portion 290 has a thickness greater than a thickness of the first and second end portions 286 and 288 of the gaskets 284.

The clamping means 292 is affixed over the flexible boot 232 of the coupler member 246. The clamping means 292 seals the end 250 of the flexible boot 232 in liquid-relation over the exterior surface 240 of the duct 234. The clamping means 292 is an annular member that is affixed in compressive contact over the flexible boot 232 of the coupler 246. The connector 254 has an annular surface 312 and an annular section 374. The annular surface 312 is formed on an end 270 of the connector 254. The first end portion 286 of the gasket 284 is received in the annular surface 312 of the coupler member 246. The annular surface 312 is a groove that has a generally U-shaped cross-section. The annular section 274 is affixed to an opposite end 260 of the flexible boot 232 of the coupler member 246. The annular surface 312 of the connector 254 is formed around an end 276 of the annular section 274 of the coupler member 246 opposite the flexible boot 232. The annular section 274 has an outer surface 252 affixed within an interior 262 of the opposite end 260 of the flexible boot 232. The annular surface 312 is formed radially outwardly from the annular section 274 and longitudinal outwardly from the flexible boot 232. It can be seen in FIG. 10 that the first end portion has a longitudinal length received in the end 276 that is less than the longitudinal length of the bulge portion 290.

Referring to FIG. 10, there is shown a cross-sectional view of coupler apparatus 230 of the present invention. The coupler apparatus 230 has a first duct 234 and a second duct 238. The first duct 234 is cast within concrete segment 400. The second duct 238 is cast within concrete segment 406. End surface 404 of concrete segment 400 faces end surface 402 of concrete segment 406.

The first duct 234 has an end 236 and an exterior surface 240. The second duct 238 has an end 242 and an exterior surface 244. The flexible boot 232 of the first coupler member 246 extends from the connector 254. The flexible boot 232 has an end 250 opposite the connector 254 that extends over and around the exterior surface 240 of the first duct 234 at the end 236 of the first duct 234. The flexible boot 256 of the second coupler member 264 extends from the connector 266. The flexible boot 256 of the second coupler member 264 has an end 278 opposite the connector 266 of the second coupler member 264 that extends over and around the exterior surface 244 of the second duct 238 at an end 242 of the second duct 238. The gasket 284 is received in the connectors 254 and 266 of the first and second coupler members 246 and 264, respectively. The first end portion 286 is received within the connector 254 of the first coupler member 246. The second end portion 288 is received within the connector 266 of the second coupler member 264. The bulge portion 290 bulges between the first end portion 286 and the second end portion 288. The bulge portion 290 extends radially outwardly farther than the first and second end portions 286 and 290. The bulge portion 290 has a thickness that is greater than the thickness of the first and second end portions 286 and 288. The first clamping means 292 is affixed over the flexible boot 232 of the first coupler member 246. The second clamping means 294 is affixed over the flexible boot 256 of the second coupler member 264. The first and second coupling means 292 and 294 seal the ends 250 and 278 of the flexible boots 232 and 256 of the first and second coupler members 246 and 264 in liquid-tight relationship over the first and second ducts 234 and 238, respectively. The first clamping means 292 is an annular member affixed in compressive contact over the flexible boot 232 of the first coupler member 246. The second clamping means 294 is an annular member affixed in compressive contact over the flexible boot 256 of the second coupler member 264.

The connector 254 of the first coupler member 246 is generally a rigid structure. The connector 266 of the second coupler member 264 is a generally rigid structure. The connector 254 of the first coupler member 246 has an annular surface 312 formed on an end 270 thereof, and an annular section 274 fixed to an opposite end 260 of the flexible boot 232 of the first coupler member 246. The connector 266 of the second coupler member 264 has an annular surface 320 formed on an end 300 thereof, and an annular section 296 affixed to an opposite end 280 of the flexible boot 256 of the second coupler member 264. The first end portion 286 of the gasket 284 is received in the annular surface 312 of the first coupler member 246. The second end portion 288 of the gasket 284 is received in the annular surface 320 of the second coupler member 264. The annular surface 312 of the connector 254 of the first coupler member 246 is formed around an end 276 of the annular section 274 of the first coupler member 246 opposite the flexible boot 232 of the first coupler member 246. The annular surface 320 of the connector 266 of the second coupler member 264 is formed around an end 298 of the annular section 296 of the second coupler member 264 opposite the flexible boot 256 of the second coupler member 264. The annular section 274 of the first coupler member 246 has an outer surface 252 affixed within an interior 262 of the opposite end 260 of the flexible boot 232. The annular section 296 of the second coupler member 264 has an outer surface 258 affixed within an interior 282 of the opposite end 280 of the flexible boot 256. The annular surface 312 of the first coupler member 246 extends radially from the annular section 274 and longitudinally outwardly from the flexible boot 232. The annular surface 320 of the second coupler member 264 extends radially outwardly from the annular section 296 and longitudinally outwardly from the flexible boot 256.

As the end surface 404 of concrete segment 400 and the end surface 402 of the concrete segment 406 are moved closer together, the bulge portion 290 of the gasket 284 is compressed between the end surfaces 404 and 402 so as to extend farther radially outwardly from the first and second end portions 286 and 288 and from the annular surfaces 312 and 320. The annular surfaces 312 and 320 are grooves. The grooves have a U-shaped cross-section. The bulge portion 290 of the gasket 284 increases the surface area of the liquid-tight seal between the concrete segments 400 and 406 when the segments 400 and 406 compress the gasket 284. Thus, the gasket 284 provides greater ability to create a liquid-tight seal between the first and second ducts 234 and 238. The seal created by the gasket 284 is larger. Thus, there is less of a chance that liquid and contaminants will enter the interiors of the first and second ducts 234 and 238. The first and second end portions 286 and 288 are formed of a thickness appropriate for fitting within the annular surfaces 312 and 320 of the connectors 254 and 256, respectively. The bulge portion 290 is positioned between the first and second end portions 286 and 288 of the gasket 284. The bulge on the outer surface of the gasket 284 thus creates a depression on the inner surface of the gasket 284. This depression is important because it minimizes the thickness of the bulge portion 290 so that the bulge portion 290 easily compresses between the end surfaces 404 and 402 of the concrete segments 400 and 406, respectively. The gasket 284 extends in a space 410 between said end surfaces 404 and 402 of said first and second concrete segments 400 and 406, respectively.

Figure 11:
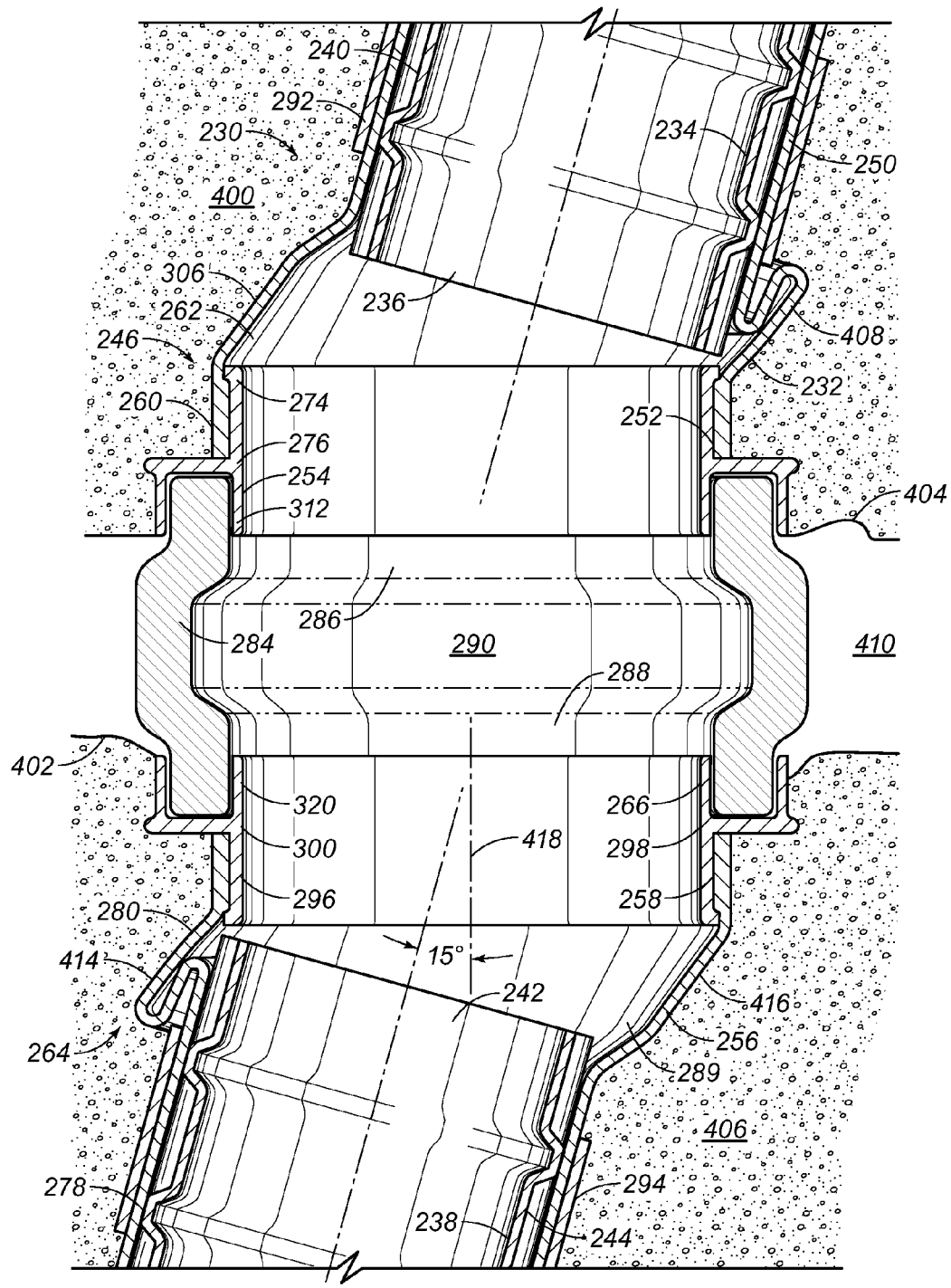
FIG. 11 shows a cross-sectional view of the preferred embodiment of the coupler apparatus of the present invention, with the ducts extending angularly relative to the faces of the concrete segments so that the coupler members are angled.

Referring to FIG. 11, there is shown a partial cross-sectional view of the apparatus 203 of the present invention. The first duct 234 extends at an angle relative to the end surface 404 of concrete segment 400. Likewise, the second duct 238 extends at an angle relative to the end surface 402 of concrete segment 406. The connector 254 of the first coupler member 246 and the connector 266 of the second coupler member 264 thus extend at a 15° angle relative to the longitudinal axis of the first and second ducts 234 and 238. Side 306 of the flexible boot 232 thus is in an extended position while side 408 of flexible boot 232 is in contracted position so as to accommodate the angled relationship between the first coupler member 246 and the end surface 404 of the concrete segment 400. The side 416 of the flexible boot 256 is in an extended position and the side 414 of the flexible boot 256 is in an retracted position so as to accommodate for the difference in angle between second coupler member 264 and the second duct 238. End surface 404 of concrete segment 400 and end surface 402 of concrete segment 406 can be seen with surface irregularities. These surface irregularities in the end surfaces 404 and 402 can create conditions for leakage of fluids, liquid, and other contaminants into the first and second ducts 234 and 238. The bulge portion 290 of the gasket 284 fill the irregularities in the end surfaces 404 and 402 when the concrete segments 400 and 406 are moved toward one another. Thus, the gasket 284 of the present invention better prevents liquids and contaminants from entering the interiors of the first and second ducts 234 and 238 by creating a larger liquid-tight seal between the ducts 234 and 238 and the concrete segments 400 and 406. The gasket 284 extends in a space 410 between said end surfaces 404 and 402 of said first and second concrete segments 400 and 406, respectively.

Figure 12:
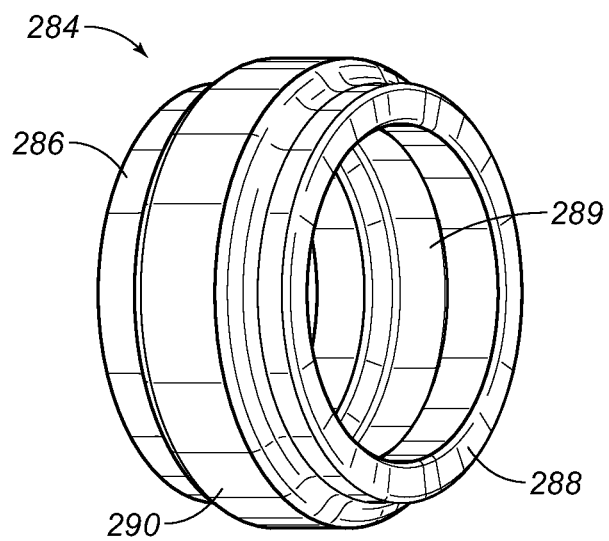
FIG. 12 shows an isolated perspective view of the preferred embodiment of the gasket of the present invention.

Referring to FIG. 12, there is shown an isolated perspective view of the gasket 284 of the present invention. The gasket 284 has an annular shape. The gasket 284 shown in FIG. 12 is circular in shape. The bulge portion 290 is positioned between the first and second end portions 286 and 288. The bulge portion 290 extends radially outwardly farther than the first and second end portions 286 and 288. The bulge portion 290 has a thickness that is greater than a thickness of the first and second end portions 286 and 288. A depression 289 is formed on an inner surface of the gasket 284 corresponding to an inner side of the bulge portion 290. The depression 289 minimizes the thickness of the gasket 284 so that the bulge portion 290 easily compresses between concrete segments. Alternatively, the gasket 284 can be formed without a depression.

Figure 13:
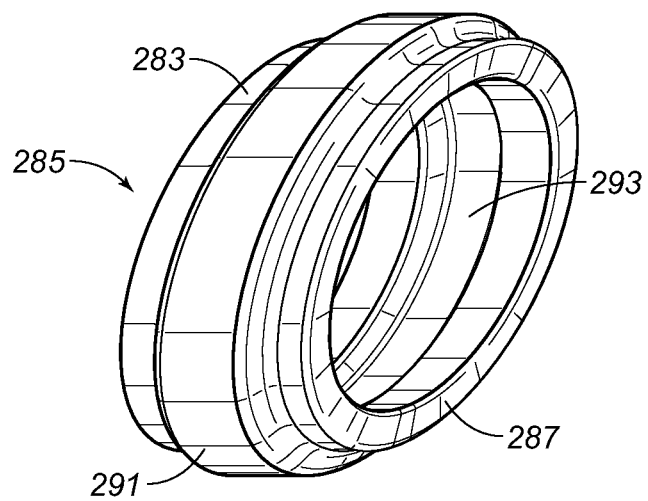
FIG. 13 shows an isolated perspective view of another embodiment of the gasket of the present invention.

Referring to FIG. 13, there is shown an isolated perspective view of another embodiment of the gasket 285 of the present invention. The gasket 285 has a generally annular shape. The gasket 285 has a generally elliptical shape. The bulge portion 291 is positioned between the first end portion 283 and the second end portion 287. The bulge portion 291 extends radially outwardly farther than the first and second end portions 283 and 287.

The present invention contemplates that the gasket of the present invention can have any shape, such as circular or elliptical, that is suitable for sealing two ducts. For example, if two adjoining ducts are square, then the present invention contemplates that the gasket have a square shape.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A coupler apparatus for use with concrete segments comprising:
   a first duct having an end and an exterior surface;
   a first coupler member having a connector at an end thereof, said first coupler member being connected to said first duct;
   a second duct having an end and an exterior surface;
   a second coupler member having a connector, said second coupler member being connected to said second duct; and
   a gasket having a first end portion received by said connector of said first coupler member and a second end portion received by said connector of said second coupler member and an intermediate portion between said first and second end portions, said intermediate portion extending radially outwardly beyond adjacent ends of both of said connectors of said first and second coupler members, said intermediate portion having a bulge portion of a thickness greater than a thickness of said first end portion and greater than a thickness of said second end portion, said gasket having a depression in an inner wall of said gasket in a location corresponding to said bulge portion, said first end portion extending linearly into said connector of said first coupler, said second end portion extending linearly into said connector of said second coupler, said bulge portion extending linearly, the length of said bulge portion greater than the length of the first end portion and greater than the length of the second end portion, said gasket and said first and second coupler members forming a liquid-tight seal between said first and second ducts.

2. The coupler apparatus of claim 1, said bulge portion extending radially outwardly farther than said first and second end portions of said gasket.

3. The coupler apparatus of claim 1, further comprising:
   a first flexible boot extending from said connector of said first duct, said first flexible boot having an end opposite said connector of said first duct extending over and around said exterior surface of said first duct at said end thereof; and
   a second flexible boot extending from said connector of said second duct, said second flexible boot having an end opposite said connector of said second duct extending over and around said exterior surface of said second duct at said end thereof.

4. The coupler apparatus of claim 3, said connector of said first coupler member having an annular section affixed to an opposite end of said first flexible boot of said first coupler member, said connector of said second coupler member having an annular section affixed to an opposite end of said second flexible boot of said second coupler member.

5. The coupler apparatus of claim 4, said annular surface of said connector of said first coupler member being formed around an end of said annular section of said first coupler member opposite said flexible boot of said first coupler member, said annular surface of said connector of said second coupler member being formed around an end of said annular section of said second coupler member opposite said flexible boot of said second coupler member.

6. The coupler apparatus of claim 5, said annular section of said connector of said first coupler member having an outer surface affixed within an interior of said opposite end of said flexible boot of said first coupler member, said annular section of said connector of said second coupler member having an outer surface affixed within an interior of said opposite end of said flexible boot of said second coupler member.

7. The coupler apparatus of claim 5, said annular surface of said first coupler member being formed radially outwardly of said annular section of said first coupler member and longitudinally outwardly of said flexible boot of said first coupler member, said annular surface of said second coupler member being formed radially outwardly of said annular section of said second coupler member and longitudinally outwardly of said flexible boot of said second coupler member.

8. The coupler apparatus of claim 1, said connector of said first coupler member being a generally rigid structure, said connector of said second coupler member being a generally rigid structure.

9. The coupler apparatus of claim 8, said connector of said first coupler member having an annular surface formed on an end thereof, said connector of said second coupler member having a annular surface formed on an end thereof.

10. The coupler apparatus of claim 9, said first end portion of said gasket being received in said annular surface of said first coupler member, said second end portion of said gasket being received in said annular surface of said second coupler member.

11. The coupler apparatus of claim 9, each of said annular surfaces of said first and second coupler members being a groove with a generally U-shaped cross-section.

* * * * *